US005636827A

United States Patent [19]

Kilgore et al.

[11] Patent Number: 5,636,827

[45] Date of Patent: Jun. 10, 1997

[54] NOTCHED NEEDLE BOUNCE ELIMINATOR

[75] Inventors: David C. Kilgore, Yorktown; John S. Bright; Russell J. Wakeman, both of Newport News, all of Va.

[73] Assignee: Siemens Automotive Corporation, Auburn Hills, Mich.

[21] Appl. No.: 309,228

[22] Filed: Sep. 20, 1994

[51] Int. Cl.[6] .................................................. F16K 31/06

[52] U.S. Cl. .................... 251/129.01; 251/122; 251/903; 239/585.5

[58] Field of Search ................................ 251/129.01, 64, 251/903, 129.15, 129.16, 122; 335/257, 277, 271; 239/585.1, 585.5

[56] References Cited

U.S. PATENT DOCUMENTS

| | | | |
|---|---|---|---|
| 5,236,173 | 8/1993 | Wakeman | 251/118 X |
| 5,392,745 | 2/1995 | Beck | 123/295 |

*Primary Examiner*—Kevin Lee
*Attorney, Agent, or Firm*—Russel C. Wells

[57] ABSTRACT

A device comprises an armature movable in a first direction and a second direction for causing a needle to contact and separate from a seat assembly. Stop means provide a motion stop in at least the first direction. Damping means are applied to the needle for reducing bounce of the needle when the needle contacts the stop means, by altering spring rates and vibration modes of the needle.

3 Claims, 2 Drawing Sheets

NOTCHED NEEDLE BOUNCE ELIMINATOR

FIELD OF THE INVENTION

The present invention relates to a solenoid actuated valve assembly and, more particularly, to means for controlling the bounce of a needle in a solenoid valve.

BACKGROUND OF THE INVENTION

Typically, a solenoid valve comprises an armature movable between a first and second position for causing a needle valve to contact and separate from a valve seat. The extremes of these first and second positions are often defined by mechanical stops. Armatures can be moved in one direction by an electro-magnetic force generated by a coil of wire and moved in the opposite direction by a return spring. When the armature needle impacts a stop, the fuel injector bounces.

In high speed fluid metering solenoids, needle bounce is a problem because each bounce of the needle meters a small uncontrolled amount of fuel into the engine, to the detriment of emissions. As can be appreciated, the leakage of fuel into the engine will result in very unfavorable fuel economy. At either end of its motion, the armature has kinetic energy as a result of its mass and velocity. With no means for dissipating that energy, it is returned to the armature by the elastic collision with the stop. Eventually, the energy is dissipated after a series of collisions and bounces. The bounce of the armature and needle affects the operation of a fuel injector by prolonging or shortening the duration of injection, causing excessive wear in the valve seat area. This bounce causes increased injection time and quantity, reduced precision of fuel quantity delivery, and poor atomization.

It is seen then that there exists a need for a means of controlling the bounce of an armature needle, thereby diminishing the amount of fuel into the engine and the wear in the valve seat area.

SUMMARY OF THE INVENTION

This need is met by the present invention, wherein the moving needle of a pulse width modulated solenoid valve is notched, grooved, or otherwise indented in order to reduce or eliminate bounce when it strikes rigid stops. The present invention alters the axial or buckling spring rates and vibration modes of the needle in order to accomplish controlled bounce.

In accordance with one aspect of the present invention, a device comprises an armature movable in a first and a second direction for causing a needle valve to contact and separate from a valve seat. Stop means provide a motion stop in at least the first direction. Damping means are applied to the needle for reducing bounce of the needle when the needle contacts the stop means, by altering spring rates and vibration modes of the needle.

For a full understanding of the nature and objects of the present invention, reference may be had to the following detailed description taken in conjunction with the accompanying drawings and the appended claims.

DESCRIPTION OF THE PREFERRED EMBODIMENT

Figure 1:
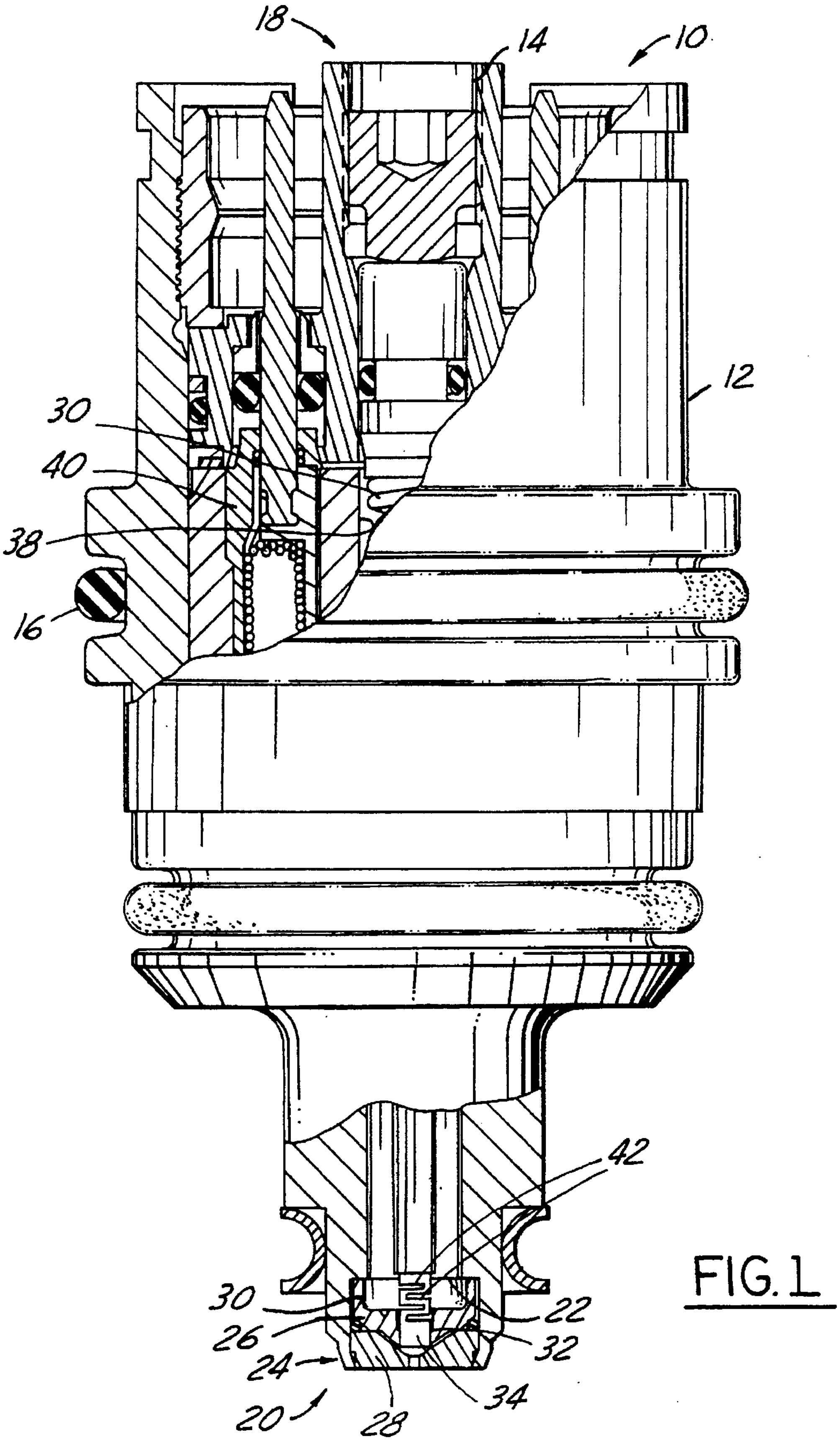
FIG. 1 is a partially cutaway cross section view of a high pressure fuel injector incorporating a preferred embodiment of the notched needle bounce eliminator in accordance with the present invention.
Figure 2:
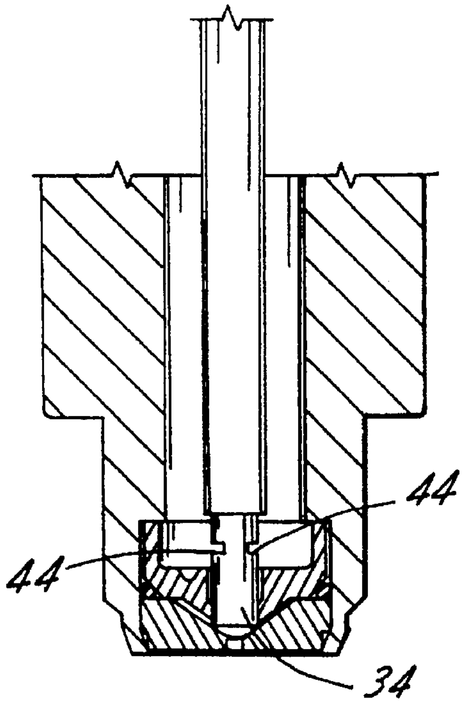
FIGS. 2–5 are views of alternative embodiments of the notched needle bounce eliminator of the present invention.

Referring to FIG. 1 there is illustrated in cross section, a typical spherical needle and cone fuel injector solenoid 10 designed to operate at fuel pressures over 1000 psi. The injector 10 includes a tubular housing 12 made from non-magnetic stainless steel. The inside of the tubular housing 12 contains an inlet tube 14 and a plurality of different diameters to form typical various shoulders for a variety of different functions. Positioned along the outside of the housing 12 are sealing means 16 to seal the injector 10 in a bore of an engine or manifold where it is located. The housing 12 has an open end 18, and an outlet end 20. The outlet end 20 is counterbored to form a shoulder 22 for locating a seat assembly 24 and a spray generator 26. The seat assembly 24 is comprised of a needle stop means such as valve seat 28, and a swirl guide 30. Adjacent to the valve seat 28 is the spray generator 26 having an axially aligned bore 32 through which reciprocates a needle valve 34.

The needle valve 34 has an essentially spherical radius for mating with the valve seat 28 to close the injector 10. At an end of the needle valve 34, opposite the spherical radius, there is a needle-armature means (not shown) comprising an armature member and a damping member. The armature member is located on the needle 34 abutting the damping member and is free to move, very slightly, axially along the needle 34 against the damping member. The end of the needle valve 34 is received in a spring retainer 36 which is slidably received in a bore 38 in an inner pole 40 of the solenoid core.

The relative organization and arrangement of these various parts are essentially the same as in the fuel injector of commonly assigned U.S. Pat. No. 4,610,080. The injector is of the type which is commonly referred to as a top-feed type, wherein fuel is introduced through inlet connector 14 and emitted as injections from the axially opposite nozzle, or tip, end.

The differences essentially relate to the inventive features of the present disclosure. The mechanism of the invention is to reduce the spring rate of the needle 34 either in buckling or compression. As will hereafter be described, the invention resides in one or more closed end notches extending along diameters of the needle valve from one side; or one or more circumferential grooves around the needle valve near the end with the spherical radius; or when the needle valve is a tube, one or more ripples around the circumference of the tube. In each case, the force transmitted along the needle valve when the valve is brought to an abrupt stop by the valve seat, the notches, grooves or ripples deflect or bend to reduce the axial length of such notches, grooves or ripples. This deflection causes the axial distance between opposite sides of the notches grooves or ripples to close up. The energy necessary to accomplish this is the kinetic energy in the needle valve as a result of the sudden stop. This kinetic energy is transformed into strain energy which is dissipated in the internal damping of the material of the needle valve. In this way, the strain energy which would be returned to kinetic energy is reduced and dampening is accomplished. It is appreciated that when material is removed from a notch or groove, the weight of the valve needle is reduced which also helps to reduce the kinetic energy of the needle valve; hence reduces bounce of the valve needle.

In addition, since a valve needle may be considered as a cloumn, modification of the column can and does effect the buckling spring rate. In the present invention, it is the first buckling mode of a column, the arc, that is affected by the application of the impact force. The kinetic energy is absorbed by means of the buckling of the needle valve.

FIG. 1 illustrates a preferred embodiment of the present invention wherein a "stairstep" arrangement of notches 42 are provided from opposite sides of the needle 34, as a damping means, in order to reduce the axial spring rate of the needle by the addition of any number of double cantilevered beams. Needle spring rate is thereby adjusted to a precise level for closing bounce elimination.

Figure 3:
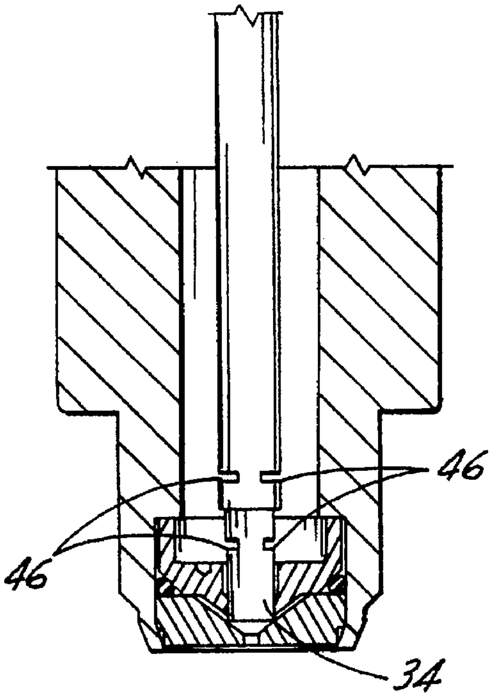
Figure 4:
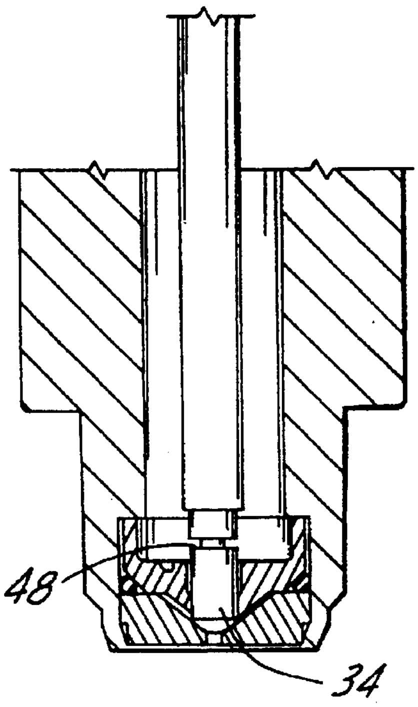
Figure 5:
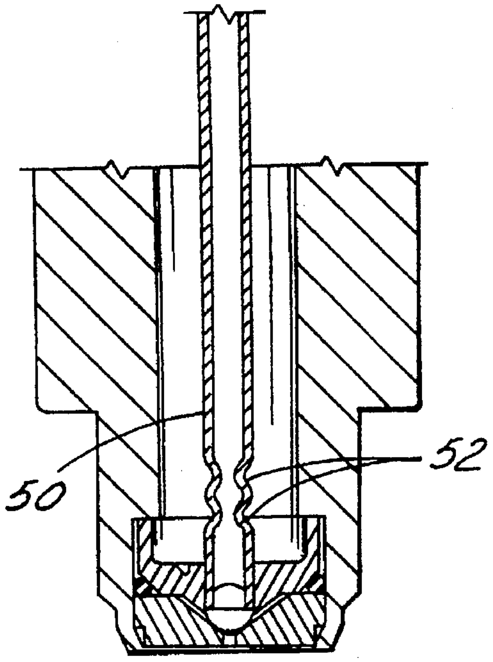

It will be obvious to those skilled in the art that there are a multitude of various embodiments which fall within the scope of the invention. FIGS. 2–5 illustrate only some of the numerous alternative embodiments of the present invention. The embodiment illustrated in FIG. 2 functions by adjusting the buckling mode shape in order to eliminate closing bounce, incorporating a notch 44. FIG. 3 illustrates a plurality of notches 46. As will be obvious to those skilled in the art, any number of notches, grooves or other indentations can be used as necessary located anywhere along the needle length. FIG. 4 illustrates a circumferential groove 48, rather than the flat-bottomed notches 42, 44 and 46 of FIGS. 1–3. FIG. 5 illustrates an embodiment wherein a rippled tube 50 replaces the needle. The ripples, or crimps, 52 in the tube 50 are designed to reduce the spring rate in a similar manner to the other constructions. The tube 50 could also be deformed in other ways, such as with scalloped dents instead of circumferential dents, in order to adjust the axial and buckling spring rates, or any combination of the two.

Those skilled in the art will recognize that the concept of the present invention can be applied to other portions of the fuel injector 10. For example, similar features can be added to the stator or armature in order to reduce opening bounce. Also, the needle can be modified at the stator end which will be especially useful for reducing opening bounce if the needle instead of the armature is used as the opening stop.

Having described the invention in detail and by reference to the preferred embodiment thereof, it will be apparent that other modifications and variations are possible without departing from the scope of the invention defined in the appended claims.

What is claimed is:

1. A notched needle for an electromechanical fuel injector having a needle valve movable in a first direction and a second direction to contact and separate from a valve seat assembly; a valve seat in said valve seat assembly for providing a motion stop to said needle valve in said first direction; damping means applied to said needle valve for reducing bounce of said needle valve when said needle valve contacts said valve seat by reducing the axial and buckling spring rate of said needle valve, the needle valve further comprising;

multiple notches formed by a plurality of radially extended flat bottomed notches extending along diameters of said needle from one side in a stairstep arrangement.

2. A notched needle for an electromechanical fuel injector having a needle valve movable in a first direction and a second direction to contact and separate from a valve seat assembly; a valve seat in said valve seat assembly for providing a motion stop to said needle valve in said first direction; damping means having at least one indentation on said needle valve for reducing bounce of said needle valve when said needle valve contacts said valve seat, by reducing the axial and buckling spring rate of said needle valve, wherein said at least one indentation comprising at least one groove formed on said needle valve.

3. A notched needle for an electromechanical fuel injector, having a tubular needle valve movable in a first direction and a second direction to contact and separate from a valve seat assembly; a valve seat in said valve seat assembly for providing a motion stop to said needle valve in said first direction; damping means applied to said needle valve for reducing bounce of said needle valve when said needle valve contacts said valve seat by reducing the axial and buckling spring rate of said needle valve, the needle valve further comprising a plurality of ripples around the circumference of said tubular needle valve for reducing the axial spring rate and buckling spring rate of said tubular needle valve.

* * * * *